(12) United States Patent
Fung

(10) Patent No.: US 10,646,310 B2
(45) Date of Patent: May 12, 2020

(54) DENTAL PROSTHESIS AND MOULDING METHOD

(71) Applicant: John Fung, Chatswood (AU)

(72) Inventor: John Fung, Chatswood (AU)

(*) Notice: Subject to any disclaimer, the term of this patent is extended or adjusted under 35 U.S.C. 154(b) by 421 days.

(21) Appl. No.: 15/328,722

(22) PCT Filed: Mar. 5, 2015

(86) PCT No.: PCT/AU2015/050087
§ 371 (c)(1),
(2) Date: Jan. 24, 2017

(87) PCT Pub. No.: WO2016/011495
PCT Pub. Date: Jan. 28, 2016

(65) Prior Publication Data
US 2017/0252136 A1 Sep. 7, 2017

(30) Foreign Application Priority Data

Jul. 24, 2014 (AU) ................... 2014902858

(51) Int. Cl.
A61C 13/08 (2006.01)
A61C 13/09 (2006.01)
(Continued)

(52) U.S. Cl.
CPC .............. *A61C 13/081* (2013.01); *A61C 5/70* (2017.02); *A61C 5/73* (2017.02); *A61C 5/77* (2017.02);
(Continued)

(58) Field of Classification Search
CPC ..... A61C 13/081; A61C 13/082; A61C 13/20; A61C 13/083; A61C 13/26; A61C 13/09;
(Continued)

(56) References Cited

U.S. PATENT DOCUMENTS 3,766,650 A 10/1973 Gnecco
6,048,203 A 4/2000 Rosenberg
(Continued)

FOREIGN PATENT DOCUMENTS

AU 2860389 A 8/1989
CN 1236761 A 12/1999
(Continued)

OTHER PUBLICATIONS

Extended European Search Report for Application No. EP15824098.6 dated Feb. 7, 2018.
(Continued)

*Primary Examiner* — Joseph S Del Sole
*Assistant Examiner* — Mohamed K Ahmed Ali
(74) *Attorney, Agent, or Firm* — Lerner, David, Littenberg, Krumholz & Mentlik, LLP

(57) ABSTRACT

A dental prosthesis is disclosed includes a prosthetic tooth element comprising ceramic and a veneer located on a surface of the prosthetic tooth element, the veneer comprising cured dental composite. The prosthetic tooth element can be fixed to a mount in a patient's mouth using the same dental composite used for the veneer. A method of forming a prosthetic tooth element is disclosed including filling a mould that is formed at least partially from flexible polymeric material with a dental mixture comprising ceramic, and applying pressure to the filled mould to form a prosthetic tooth element comprising ceramic with a roughened surface.

17 Claims, 10 Drawing Sheets

(51) Int. Cl.
    *A61C 13/15*     (2006.01)
    *A61C 13/271*     (2006.01)
    *A61C 5/73*     (2017.01)
    *A61C 5/77*     (2017.01)
    *A61C 13/083*     (2006.01)
    *A61C 5/70*     (2017.01)
    *A61C 13/20*     (2006.01)

(52) U.S. Cl.
    CPC .......... *A61C 13/082* (2013.01); *A61C 13/083* (2013.01); *A61C 13/09* (2013.01); *A61C 13/20* (2013.01); *A61C 13/26* (2013.01); *A61C 19/003* (2013.01)

(58) Field of Classification Search
    CPC ........... A61C 5/70; A61C 19/003; A61C 5/73; A61C 5/77
    See application file for complete search history.

(56) References Cited

U.S. PATENT DOCUMENTS

| | | |
|---|---|---|
| 2001/0001510 A1 | 5/2001 | Rheinberger et al. |
| 2003/0125189 A1 | 7/2003 | Castro et al. |
| 2007/0065780 A1 | 3/2007 | Dorsman et al. |
| 2009/0104584 A1 | 4/2009 | Ferrilli |
| 2009/0115084 A1 | 5/2009 | Moon |
| 2009/0321971 A1 | 12/2009 | Brodkin et al. |
| 2012/0175802 A1 | 7/2012 | Goetzinger et al. |
| 2012/0193823 A1 | 8/2012 | Goetzinger et al. |
| 2012/0269957 A1 | 10/2012 | Zothner et al. |
| 2013/0177876 A1 | 7/2013 | Homann et al. |
| 2013/0313738 A1 | 11/2013 | Carden |
| 2015/0140513 A1* | 5/2015 | Burke .................... C03C 3/083 433/202.1 |
| 2015/0245889 A1* | 9/2015 | Ikushima ............... A61C 13/34 433/223 |

FOREIGN PATENT DOCUMENTS

| | | |
|---|---|---|
| CN | 101862226 A | 10/2010 |
| CN | 102548498 A | 7/2012 |
| EP | 2532322 | 12/2012 |
| GB | 259812 | 10/1926 |
| GB | 259812 A | 10/1926 |
| GB | 499959 | 1/1939 |
| WO | 2007000310 A1 | 1/2007 |
| WO | 2007028787 A1 | 3/2007 |
| WO | 2013158829 A1 | 10/2013 |
| WO | 2013158836 A1 | 10/2013 |

OTHER PUBLICATIONS

English Translation of First Office Action in Chinese Patent Application No. 201580041210.8 dated Apr. 26, 2018.

International Search Report for International Patent Application No. PCT/AU2015/050087 dated May 4, 2015.

Duran I, Güler AU. Light transmission of zirconia ceramics with different colors and thicknesses. Journal of Dental Sciences. Nov. 19, 2012, pp. 1-7.

Tango RN, Sinhoreti MA, Correr AB, Schneider LF, Kimpara ET, Correr-Sobrinho L. Knoop hardness of dental resin cements: Effect of veneering material and light curing methods. Polymer Testing. Apr. 1, 2007;26(2):268-73.

Good ML, Mitchell CA, Pintado MR, Douglas WH. Quantification of all-ceramic crown margin surface profile from try-in to 1-week post-cementation. Journal of dentistry. Jan. 1, 2009;37(1):65-75.

Mazurek K, Mierzwinska-Nastalska EL, Molak R, Kozuchowski M, Pakiela Z. Strength and thickness of the layer of materials used for ceramic veneers bonding. Acta of Bioengineering & Biomechanics. Oct. 1, 2012;14(3).

* cited by examiner

DENTAL PROSTHESIS AND MOULDING METHOD

CROSS-REFERENCE TO RELATED APPLICATIONS

The present application claims priority from Australian Provisional Patent Application No 2014902858 filed on 24 Jul. 2014, the content of which is incorporated herein by reference.

TECHNICAL FIELD

This present disclosure relates to dental prostheses and methods for preparing dental prostheses including parts thereof.

BACKGROUND

A dental prosthesis such as a crown or bridge provides an artificial tooth structure that is designed to replace all or part of one or more teeth that have been partially or wholly lost, e.g., through decay or other damage. The dental prosthesis is secured to a mount in the mouth such as a dental implant or part of one or more existing teeth.

A dental prosthesis is typically formed from a block of solid dental ceramic such as zirconia, which is milled to the desired shape to form a ceramic, prosthetic tooth element. A porcelain veneer is provided over the surface of the prosthetic tooth element to arrive at a dental prosthesis having a desired size, shape and colour.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

SUMMARY

According to one aspect, the present disclosure provides a method of forming a dental prosthesis comprising:
   applying a curable dental composite to a surface of a prosthetic tooth element, the prosthetic tooth element comprising ceramic; and
   curing the dental composite to form a veneer on the prosthetic tooth element.

According to another aspect, the present disclosure provides a dental prosthesis comprising a prosthetic tooth element comprising ceramic, and a veneer located on a surface of the prosthetic tooth element, the veneer comprising cured dental composite.

The ceramic material of the prosthetic tooth element may comprise zirconia, zirconia-oxide, aluminium oxide or other materials usable as dental ceramics.

According to one aspect, the present disclosure provides a method of forming a dental prosthesis comprising:
   providing a prosthetic tooth element comprising ceramic, the ceramic comprising at least one of zirconia, zirconia-oxide and aluminium oxide;
   applying a curable dental composite to the zirconia, zirconia-oxide or aluminium oxide ceramic at a surface of the prosthetic tooth element; and
   curing the dental composite to form a veneer on the prosthetic tooth element.

According to another aspect, the present disclosure provides a dental prosthesis comprising a prosthetic tooth element comprising ceramic, the ceramic comprising at least one of zirconia, zirconia-oxide and aluminium oxide zirconia, and a veneer located on the zirconia, zirconia-oxide and aluminium oxide zirconia at a surface of the prosthetic tooth element, the veneer comprising cured dental composite.

A dental composite is a type of synthetic resin, and is typically used as a filling material for dental cavities. However, the inventor has determined that a dental composite can be used advantageously to form a veneer over a ceramic prosthetic tooth element. Dental composite can form a softer veneer than porcelain. The provision of a softer veneer can reduce its abrasive properties and therefore reduce damage caused by the veneer to surrounding or opposing natural teeth. Further, the dental ceramic can be easier to replace than a porcelain veneer, enabling restorative action to be taken during a standard dental appointment, for example.

The dental composite may comprise a resin matrix, e.g., a resin-based oligomer matrix. The resin matrix may comprise, for example, Bis-GMA (bisphenol-A glycidyl methacrylate), or other dimethacrylate monomers such as UDMA (urethane dimethacrylate), TEGDMA (triethylene glycol dimethacrylate), or HDDMA (hexane diol dimethacrylate).

The dental composite may additionally comprise filler particles, such as silica particles, quartz or glass. The filler particles may determine the surface smoothness and hardness of the dental composite and can therefore be adjusted to achieve a balance between strength of the veneer and reduced abrasiveness. The filler content can also be adjusted to achieve desired flowability of the dental composite.

The dental composite may additionally comprise a coupling agent for the filler particles and the resin matrix. The coupling agent may include a bifunctional molecule such as organosilane, which bonds to both the resin and filler particles.

The dental composite may additionally comprise optical modifiers and pigments to adjust the colour and the opacity or translucency of the composite to natural tooth material. For example, the dental composite may comprise metal oxide particles such as titanium oxide or aluminium oxide.

In one embodiment, the dental composite is curable using light (i.e. is photo-curable). The dental composite may therefore comprise light activatable material that sets when exposed to light. Light activatable material may include a photoinitiator molecule such as camphorquinone, phenylpropanedione or lucirin. However, material offering heat-activated, chemically-activated or dual (light/heat and chemical) activated cure may also be used.

The composite material may be provided in a paste form, which is dispensed, e.g. squeezed from a tube or other container, over the ceramic tooth element. The composite material may then be sculpted by hand to achieve a desirable veneer profile/shape.

The method may further comprise forming the prosthetic tooth element. The prosthetic tooth element may be formed by milling or moulding of ceramic material.

The dental prosthesis may be formed by an indirect method, outside the patient's mouth or by a direct method, inside the patient's mouth. The indirect method may comprise forming the veneer while the prosthetic tooth element is mounted on a model of the patient's tooth or teeth. The direct method may comprise forming the veneer while the prosthetic tooth element is mounted inside the patient's mouth.

The prosthetic tooth element may be located in the mouth over a mount such as one or more dental implants or part of pre-existing natural tooth or teeth. To fix the prosthetic tooth element to the mount, a bonding material may be applied between the prosthetic tooth element and the mount. The bonding material may be a dental composite that is cured (e.g. by light) to achieve hardening of the bonding material. The veneer and prosthetic tooth element may be at least partially light-transmissive to enable light to travel through the bonding material.

The dental composite that is used to bond the prosthetic tooth element to the mount may be the same or substantially the same as the dental composite that is used to form the veneer (e.g., they may have the same chemical composition). By using the same or substantially the same dental composite as used to form the veneer, the dental procedure may have reduced cost and may be more straightforward. For example, fewer materials may be required and the dental composite may be dispensed from the same dispenser in each instance. Further, the same curing technique (e.g., a light curing technique) may be employed to cure both the veneer and the bonding material. Thus, curing of the veneer and bonding material may be achieved at the same time and/or using the same light source.

If the prosthetic tooth element is formed by a milling process, the surface of the tooth element may be a very smooth (glass-like) surface, making bonding of the dental composite to the tooth element harder to achieve. Accordingly, prior to application of the dental composite, the tooth element may be provided with a roughened surface. The roughened surface may be created during formation of the prosthetic tooth element or subsequently. For example, after the tooth element is formed by milling (and subsequent sintering), chemical etching, grinding, abrasion with a rotary instrument, air abrasion using abrasive particles, and/or a combination of these approaches may be employed. The roughened surface may have surface irregularities with depth of, e.g., greater than 5 µm, 5 to 50 µm, or 10 to 40 µm or otherwise.

The inventor has found that one advantageous technique to form a prosthetic tooth element with a roughened surface is through a specific moulding method.

In more detail, and in accordance with one aspect of the present disclosure, there is provided a method of forming a prosthetic tooth element comprising:

filling a mould that is formed at least partially from flexible polymeric material with a dental mixture comprising ceramic; and applying pressure to the filled mould to form a prosthetic tooth element comprising ceramic with a roughened surface.

When pressure is applied to the mould, since the mould is at least partially formed of flexible polymeric material, the inventor has found that vibration or other types of relative motion can occur at the interface between the dental mixture and the mould, introducing irregularities and therefore roughness in the surface of the prosthetic tooth element comprising ceramic. Again, the roughened surface may have surface irregularities with depth of e.g., greater than 5 µm, 5 to 50 µm, or 10 to 40 µm or otherwise. The roughened surface may provide a favourable surface for bonding of additional components and materials.

The dental mixture comprising ceramic may comprise ceramic powder and a binding agent, for example. The ceramic may be zirconia, zirconia-oxide or aluminium oxide, for example. The binding agent may be any adhesive typically used to bind ceramic powder together.

The roughened surface may extend around all or part of the prosthetic tooth element. The dental composite that is used to form the veneer may be applied to a first portion of the roughened surface and/or the dental composite that is used to bond the prosthetic tooth element to the mount may be applied to a second portion of the roughened surface.

When the veneer is formed on the roughened surface (e.g. the first portion of the roughened surface), the veneer may have a relatively strong bond to the prosthetic tooth element. For example, the bond between the veneer and the prosthetic tooth element may be considerably stronger than if the surface of the prosthetic tooth element were smooth, as would be typical if the prosthetic tooth element were formed by a milling process as discussed above, for example.

Similarly, when the bonding material is applied to the roughened surface (e.g. the second portion of the roughened surface), to bond the prosthetic tooth element to the mount, the prosthetic tooth element may have a relatively strong bond to the mount. For example, the bond between the prosthetic tooth element and the mount may also be considerably stronger than if the surface of the prosthetic tooth element were smooth. In general, any weak bond between the veneer and the prosthetic tooth element and/or between the prosthetic tooth element and the mount could otherwise leave the prosthetic tooth element and/or dental prosthesis vulnerable to damage such as delamination, dislocation and falling out.

The use of a mould that is at least partially formed of flexible polymeric material, and the application of high pressure to this mould, may provide a particularly efficient and effective means of forming the prosthetic tooth element. For example, it may not be necessary to provide roughening of a surface of the mould. Thus, to the extent that the mould is formed by making an at least partial impression of a tooth to arrive at a negative of the prosthetic tooth element, for example, further processing of the mould to introduce a negative roughened surface may not be necessary. The surface of the mould at the interface with the dental mixture may therefore be smooth in some embodiments. This may make release of the prosthetic tooth element from the mould more straightforward. Flexibility of the mould due to the inclusion of flexible polymeric material may also assist with release of the prosthetic tooth element from the mould after forming.

The use of a mould that is at least partially formed of flexible polymeric material, and the application of high pressure to this mould, may also cause a more fibrous prosthetic tooth element to be formed. In essence, the roughness may extend beyond the surface and throughout all or part of the body of the prosthetic tooth element. Such a configuration may reduce the ease at which cracks may propagate through the prosthetic tooth element, e.g. in contrast to ceramic prosthetic tooth element formed through standard techniques, which prosthetic tooth elements can be susceptible to fine cracks causing failure of the dental prosthesis.

The mould may comprise a first mould part and a second mould part adapted to be brought together to form a prosthetic tooth element-shaped recess into which the dental mixture is filled prior to the application of the pressure. At least one of the first and second mould parts may comprise the flexible polymeric material. In one embodiment, both the first and second mould parts comprise the flexible polymeric material.

When the first mould part comprises flexible polymeric material, the flexible polymeric material of the first mould part may define a first flexible mould surface of the prosthetic tooth element-shaped recess.

When the second mould part comprises flexible polymeric material, the flexible polymeric material of the second mould part may define a second flexible mould surface of the prosthetic tooth element-shaped recess.

One of the first and second mould surfaces may be shaped to form an inner surface of the prosthetic tooth element to bond to the mount and the other of the first and second mould surfaces may be shaped to form an outer surface of the prosthetic tooth element to which the veneer is applied.

In order to determine appropriate shapes for the inner and outer surfaces, a dental impression of one or more mounts of the patient may be obtained. Alternatively, the shapes may be based on generic models of teeth and mounts of different sizes, determined through computer analysis of average representations of patients' teeth, for example.

According to one aspect of the present disclosure, there is provided a compression mould for creating a prosthetic tooth element comprising ceramic, the mould comprising:

a first mould part and a second mould part adapted to be brought together to form a prosthetic tooth element-shaped recess, at least one of the first and second mould parts comprising flexible polymeric material;

wherein the mould is configured such that, upon filling of the recess with dental mixture comprising ceramic and applying pressure to the mould, a prosthetic tooth element comprising ceramic with a roughened surface is formed.

The flexible polymeric material may be sufficiently rigid to enable the mould parts to form the prosthetic tooth element of a desired shape under pressure, yet be sufficiently flexible to vibrate or undertake other movements under pressure in order to cause a roughened surface to be formed on the surface of the prosthetic tooth element as described above. Examples of such materials include but are not limited to natural and synthetic rubbers (e.g. silicone rubber) and elastic dental impression material, which material may comprise elastomers, polysulfides, polyethers and/or hydrocolloids such as agar reversible, agar irreversible and alginate.

One or both of the first and second mould parts may comprise a plate located at an outer surface thereof. The plate may be rigid and relatively hard in comparison to the flexible polymeric material. The plate may serve as a support for the flexible polymeric material and may provide a uniform surface to which pressure can be applied to the mould part. The plate may extend around one or more sides of the mould part. For example, the plate may extend around three sides of the mould part such as to substantially define a recess in which the flexible polymeric material is held.

Pressure application apparatus may be provided to apply pressure to the mould parts. The pressure application apparatus may include a hydraulic or pneumatic ram or other instrument/device capable of clamping and compressing the two mould parts together at the desired pressure for an extended period of time. The pressure application means may apply pressure directly to the plates, which pressure is transferred through the flexible polymeric material and to the dental mixture.

The plates may be formed from any suitable material which is able to withstand the pressure applied to the mould. For example, the plates may be formed of a metal such as steel. Other materials such as hard polymers, ceramics or composites thereof may be used.

Pressure, expressed herein in units of metric tonne (1000 kg) per square centimetre, may be applied to the mould at greater than 0.5 tonnes per square centimetre, greater than 1 tonnes per square centimetre, greater than 2.0 tonnes per squarer centimetre, between 0.5 and 4 tonnes per square centimetre, between 1 and 4 tonnes per square centimetre, between 1.5 and 4.0 tonnes per square centimetre, about 1.5 tonnes per square centimetre, about 2 tonnes per square centimetre, about 2.5 tonners per square centimetre or otherwise.

Pressure may applied to the mould non-uniformly or periodically in order to increase roughening of the surface of the prosthetic tooth element. For example, pressure may be applied once for a short duration, released, and then re-applied, providing for discrete and/or cyclical applications of pressure. In another example, pressure may be applied continually, but the amount of pressure may be varied over time.

In one embodiment, the mould may be adapted to form multiple prosthetic tooth elements. For example, the mould may comprise a plurality of prosthetic tooth element-shaped recesses that are formed when the first and second mould parts are brought together, each recess being adapted for filling with the dental mixture and for forming a prosthetic tooth element comprising ceramic upon application of pressure to the mould. The mould may allow for manufacture of multiple non-patient specific prosthetic tooth elements at the same time. Having a number of pre-fabricated prosthetic tooth elements of several sizes at the clinic may save a patient multiple visits to the clinic and increase efficiency of a dental restoration procedure.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

BRIEF DESCRIPTION OF DRAWINGS

By way of example only, embodiments are now described with reference to the accompanying drawings, in which.

DESCRIPTION OF EMBODIMENTS

Methods of preparing a dental prosthesis according to embodiments of the present disclosure are now described. The methods may be carried out by a dentist, dental surgeon, clinician, and/or technician, for example.

In an embodiment as now described with reference to FIGS. 1 to 9, a dental prosthesis 2, e.g., a crown or bridge, is formed externally to a patient's mouth. The method of forming the prosthesis 2 may therefore be considered an indirect method.

Figure 1:
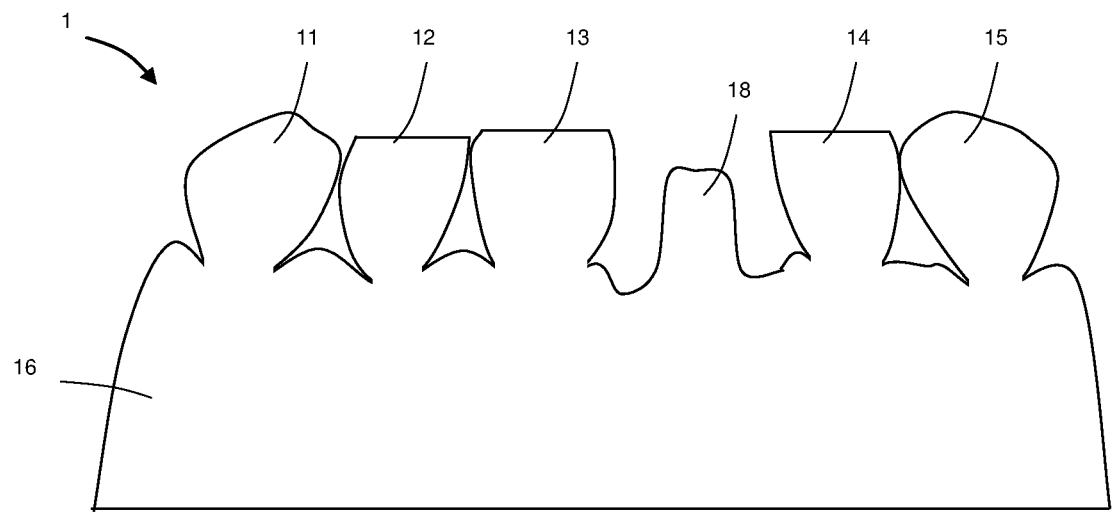
FIG. 1 shows a cross-sectional side view of a model of a row of teeth used in a method of preparing a dental prosthesis in accordance with an embodiment of the present disclosure.

Impressions of the patient's teeth are obtained from which a model of a row of the patient's teeth 1 is prepared. With reference to FIG. 1, the model 1 comprises a plurality of model teeth 11-15 and a base section 16 corresponding to a portion of the patient's gums. The model 1 further comprises a model of a tooth root (partial tooth) 18 that located between two of the model teeth 13, 14.

After the model 1 is prepared, a prosthetic tooth element 20 is selected, formed of zirconia or another dental ceramic, which has a substantial tooth-like configuration and includes a recess 21 on its bottom surface for locating over the model tooth root 18. Outer surfaces of the prosthetic tooth element 20, which are to receive a veneer, are roughened through grinding, chemical (acid) etching or abrasion, or through manufacturing of the prosthetic tooth element 20 using a moulding technique such as the technique described further below with reference to FIGS. 15 to 20.

Figure 2:
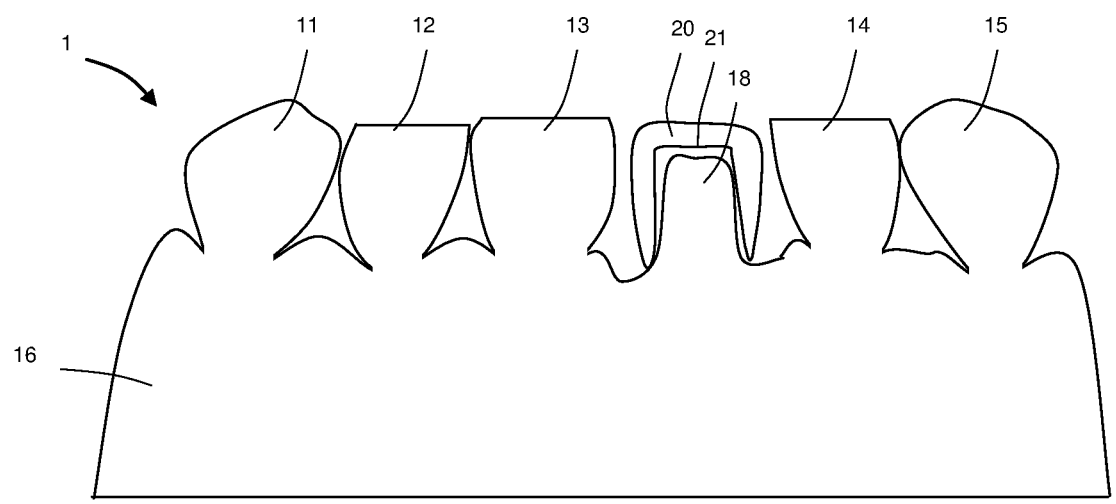
FIG. 2 shows a cross-sectional side view of a combination of the model of FIG. 1 with a prosthetic tooth element.

In this embodiment, the prosthetic tooth element is selected from a plurality of prosthetic tooth elements of different shapes and sizes in order to provide as close as possible initial match between the prosthetic tooth element and the shape and size of the original tooth and the adjacent teeth. The initial match can be checked by locating the tooth element over the model tooth root 18 as shown in FIG. 2.

Figure 3:
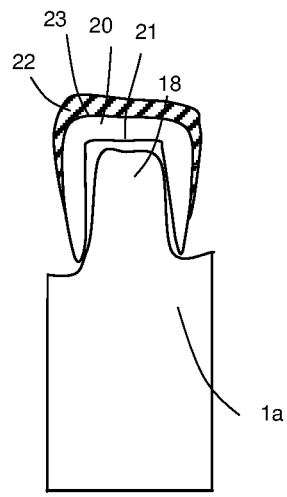
FIG. 3 shows a cross-sectional side view of a divided portion of the combination of FIG. 2, in which the prosthetic tooth element has a coating of dental composite.

Next, as represented in FIG. 3, a portion 1a of the model 1, comprising the model root 18, is divided from the remaining portion 1b of the model 1, including the remainder of the model teeth 11-15. With the prosthetic tooth element 20 located over the model root 18, a coating of dental composite 22 is applied to the outer roughened surfaces of the prosthetic tooth element 20, including the occlusial or incisal surface 23. The coating 22 is a paste of dental composite initially stored in a dispenser, which is squeezed and/or spread over the prosthetic tooth element of otherwise.

Figure 4:
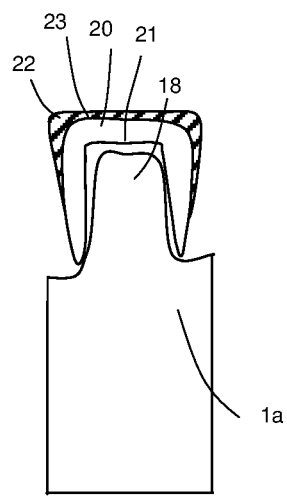
FIG. 4 shows a cross-sectional side view of the divided portion of FIG. 3, in which the coating of dental composite has been sculpted to a desired shape.

Subsequently, as represented in FIG. 4, the coating 22 is sculpted to achieve a desired outer profile for the prosthetic tooth element, corresponding to a desired shape of the finished dental prosthesis.

Figure 5:
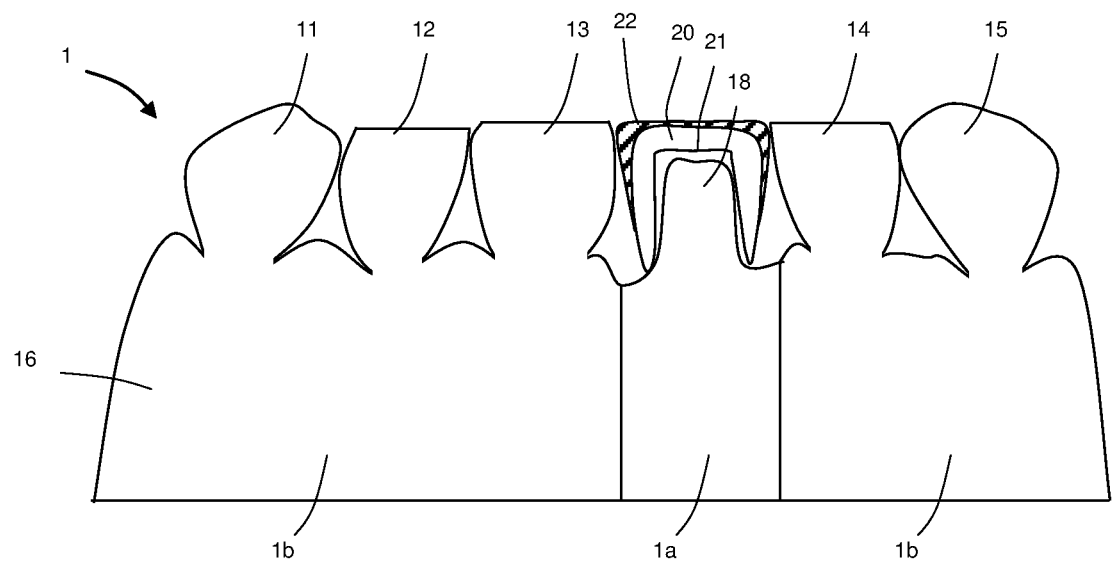
FIG. 5 shows a cross-sectional side view of the divided portion of FIG. 4 reconnected to the remaining portion of the model teeth.

The sculpted, coated prosthetic tooth element 20 and the associated portion 1a of the model may be reconnected with the remaining portion 1b of the model teeth as represented in FIG. 5. This enables a check to be made that the coated prosthetic tooth element 20 has a final match of shape and size with the adjacent teeth.

Figure 6:
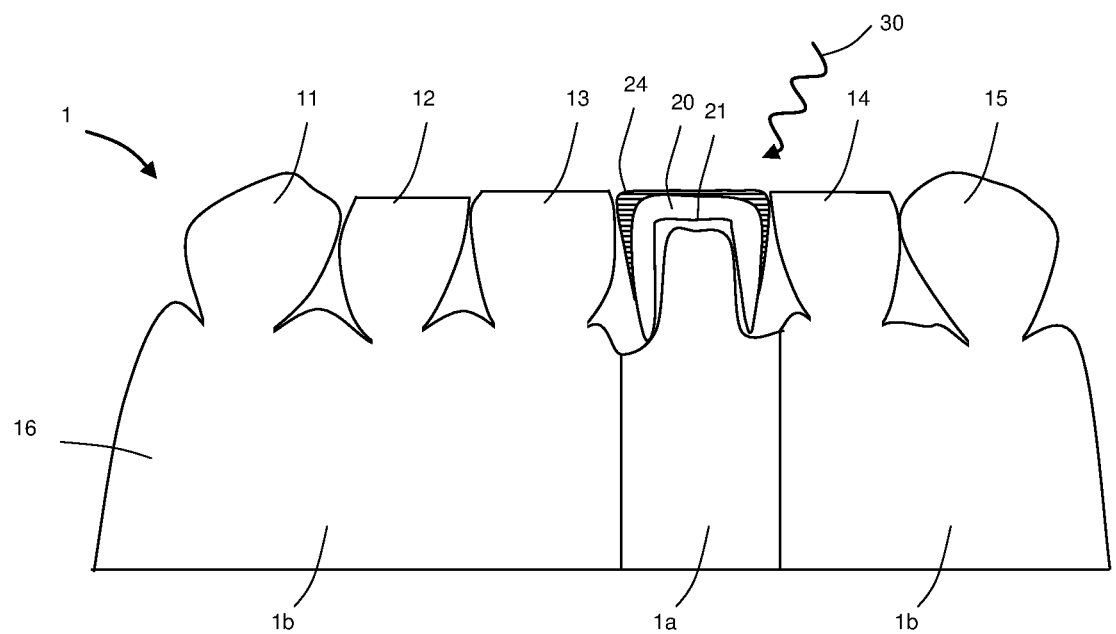
FIG. 6 shows a cross-sectional side view of the combination of the prosthetic tooth element, having a sculpted coating, with the model teeth of FIG. 5, in which the coating is subjected to light curing to form a dental prosthesis having a veneer.
Figure 7:
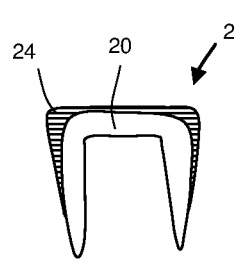
FIG. 7 shows a cross-sectional side view of the dental prosthesis of FIG. 6.

With reference to FIG. 6, the coating 22 is then subjected to light curing through the application of light 30 from a light source such as a tungsten halogen light, LED light or otherwise, which light 30 has a suitable intensity, duration and wavelength to effect the curing. The curing causes the coating 22 to harden, forming a dental composite veneer 24 on the surface of the prosthetic tooth element 20 and thus forming a substantially finished dental prosthesis 2 as also illustrated in FIG. 7.

Figure 8:
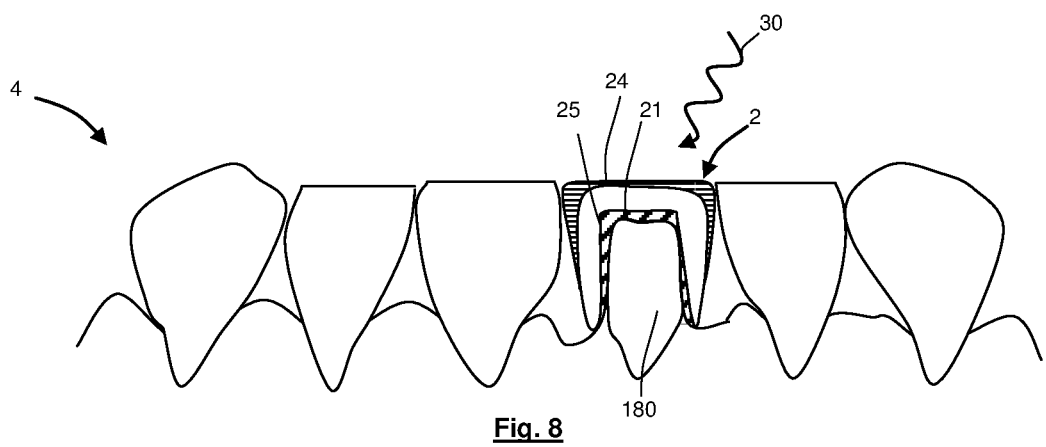
FIG. 8 shows a cross-sectional side view of the dental prosthesis of FIG. 7 located over a root in a mouth, with dental composite located between the dental prosthesis and the root and subjected to light curing.
Figure 9:
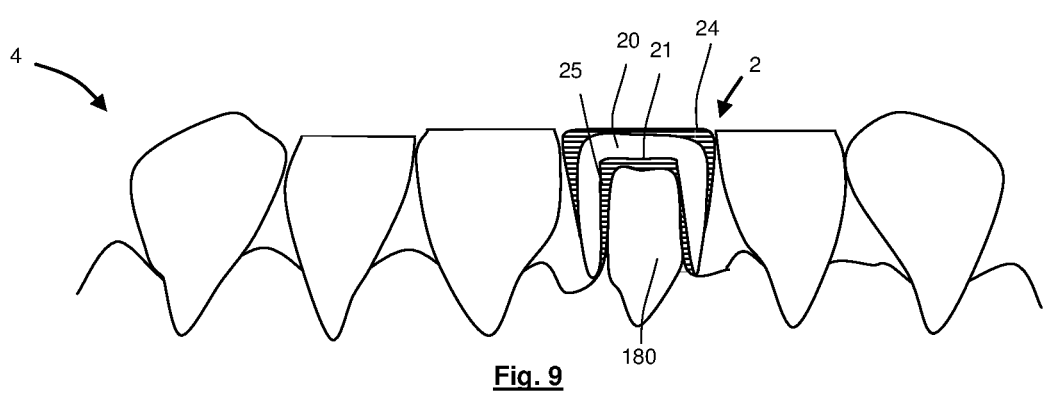
FIG. 9 shows a cross-sectional side view of the dental prosthesis of FIG. 8 in which the dental composite located between the dental prosthesis and the root has been light cured such that the dental prosthesis is fixed to the root.

Referring to FIG. 8, the dental prosthesis 2 is then located in a row of teeth 4 of the patient's mouth, over the root 180 upon which the model tooth root 18 was based, the root 180 providing a form of mount for the dental prosthesis 2. To fix the dental prosthesis 2 in place on the root 180, the same type of dental composite that was used to form the coating 22 is dispensed from the dispenser for use as a bonding material 25 between the root 180 and the recess 21 of the dental prosthesis 2. The dental composite is subjected to light curing through the application of light 30 from a light source such as a tungsten halogen light, LED light or otherwise, which light 30 has a suitable intensity, duration and wavelength to effect the curing. The light source can be the same light source as used to cure the coating 22 to form the veneer 24. Once the bonding material has cured, insertion of the dental prosthesis 2 is complete, as illustrated in FIG. 9.

The dental composite used in this or any other embodiment may comprise a resin matrix, e.g. a resin-based oligomer matrix. The resin matrix may comprise, for example, Bis-GMA (bisphenol-A glycidyl methacrylate), or other dimethacrylate monomers such as UDMA (urethane dimethacrylate), TEGDMA (triethylene glycol dimethacrylate), or HDDMA (hexane diol dimethacrylate).

The dental composite may additionally comprise filler particles, such as silica particles, quartz or glass. The filler particles may determine the surface smoothness and hardness of the dental composite and can therefore be adjusted to achieve a balance between strength of the veneer and reduced abrasiveness to other teeth. The filler content can also be adjusted to achieve desired flowability of the dental composite.

The dental composite may additionally comprise a coupling agent for the filler particles and the resin matrix. The coupling agent may include a bifunctional molecule such as organosilane, which bonds to both the resin and filler particles.

The dental composite may additionally comprise optical modifiers and pigments to adjust the colour and the opacity or translucency of the composite to natural tooth material. For example, the dental composite may comprise metal oxide particles such as titanium oxide or aluminium oxide.

The dental composite may include a photoinitiator molecule such as camphorquinone, phenylpropanedione or lucirin.

In another embodiment as now described with reference to FIGS. 10 to 14, a dental prosthesis 5, e.g., a crown or bridge, is formed (or at least finished) within the patient's mouth. The method of forming the prosthesis may therefore be considered a direct method.

In particular, a prosthetic tooth element 50 is selected, formed of zirconia or another dental ceramic, which has a substantial tooth-like configuration and includes a recess 51 on its bottom surface for locating over a tooth root 180 in the patient's mouth. Outer surfaces of the prosthetic tooth element 50, which are to receive a veneer, are roughened through grinding, chemical (acid) etching or abrasion, or through manufacturing of the prosthetic tooth element 50 using a moulding technique such as the technique described further below with reference to FIGS. 15 to 20.

Figure 10:
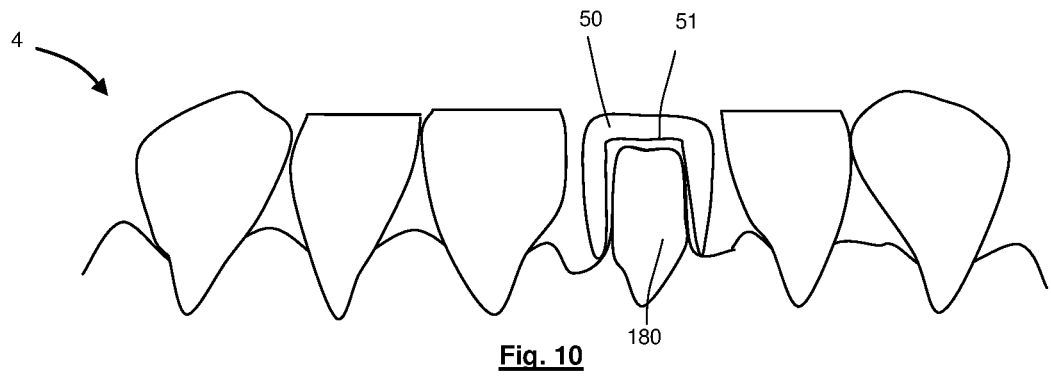
FIG. 10 shows a cross-sectional side view of a prosthetic tooth element located over a root in a mouth in accordance with another embodiment of the present disclosure.

In this embodiment, the prosthetic tooth element 50 is again selected from a plurality of ceramic prosthetic tooth elements of different shapes and sizes in order to provide as close as possible initial match between the tooth element 50 and the shape and size of the original tooth and the adjacent teeth. The initial match can be checked by locating the tooth element over the tooth root 180 as shown in FIG. 10.

Figure 11:
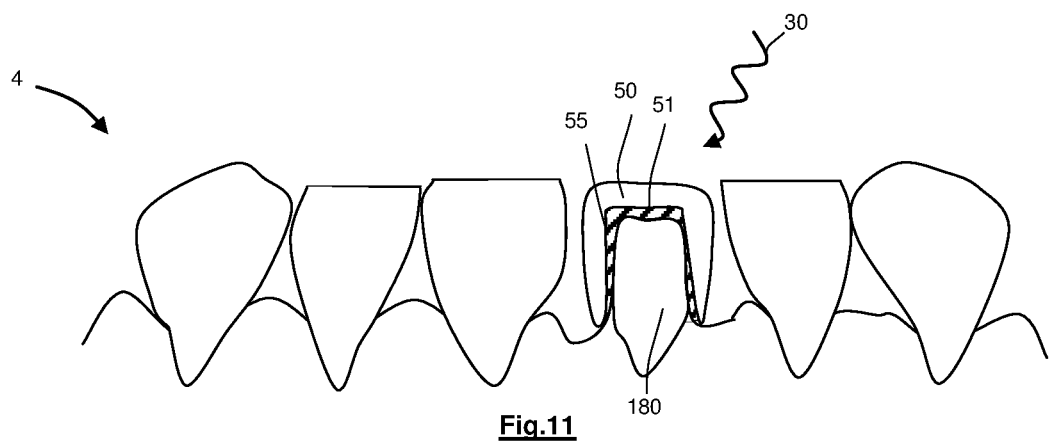
FIG. 11 shows a cross-sectional side view of the prosthetic tooth element and mouth of FIG. 10, in which dental composite has been located between the prosthetic tooth element and the root and subjected to light curing to fix the prosthetic tooth element to the root.

Next, as represented in FIG. 11, to fix the prosthetic tooth element 50 to the root 180, dental composite is dispensed as a bonding material 55 between the root 180 and the recess 51 of prosthetic tooth element 50 and is subjected to light curing through the application of light 30 from a light source such as a tungsten halogen light, LED light or otherwise, which light 30 has a suitable intensity, duration and wavelength to effect the curing.

Figure 12:
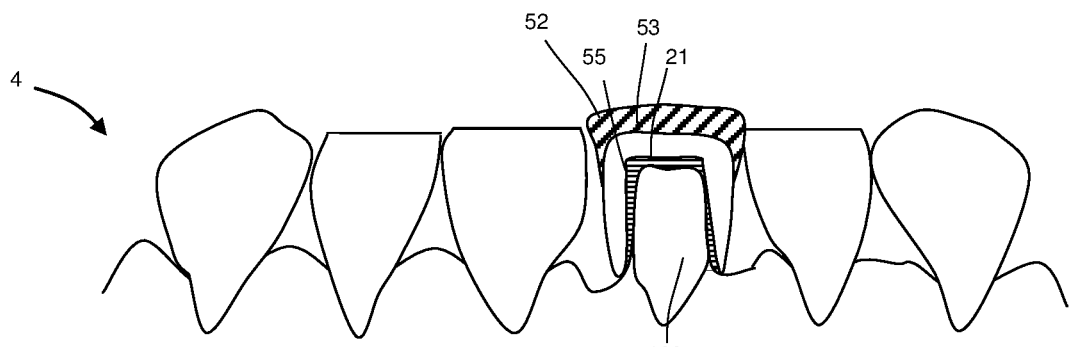
FIG. 12 shows a cross-sectional side view of the prosthetic tooth element and mouth of FIG. 11, in which the prosthetic tooth element has a coating of dental composite.

As represented in FIG. 12, a coating 52 of the same dental composite that was used to fix the prosthetic tooth element 50 to the root 180 is then applied to outer surfaces of the prosthetic tooth element 50, including its occlusial or incisal surface 53. The coating 52 is a paste of the dental composite, which is squeezed and/or spread over the prosthetic tooth element of otherwise.

Figure 13:
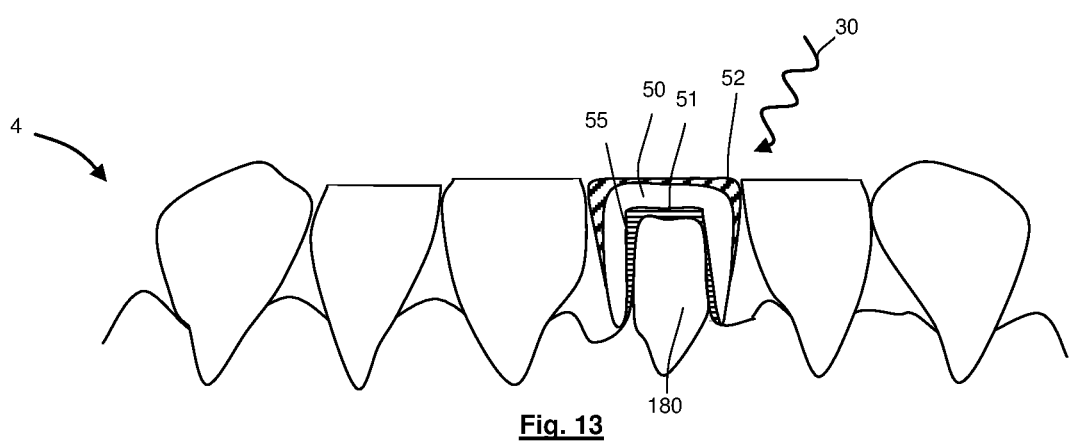
FIG. 13 shows a cross-sectional side view of the prosthetic tooth element and mouth of FIG. 12, in which the coating of dental composite has been sculpted to a desired shape and is subjected to light-curing.

Subsequently, as represented in FIG. 13, the coating 52 is sculpted to achieve a desired outer profile to the prosthetic tooth element 50, corresponding to desired shape of the finished dental prosthesis 5.

Figure 14:
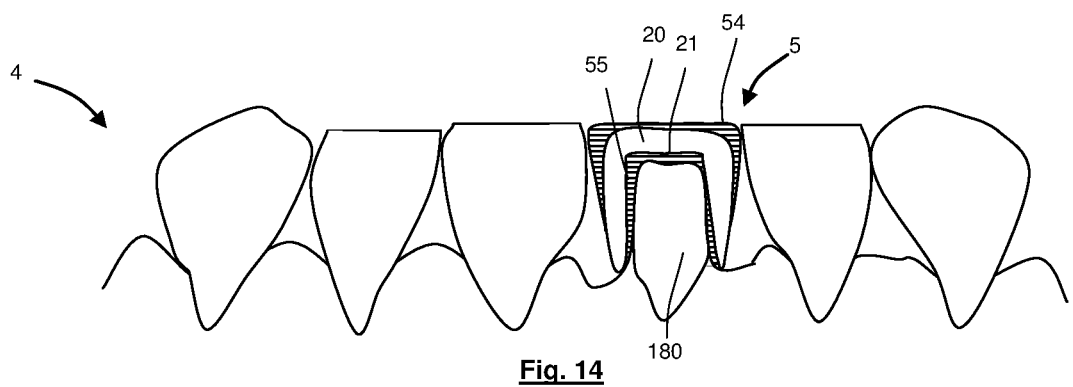
FIG. 14 shows a cross-sectional side view of the prosthetic tooth element and mouth of FIG. 14, in which the light-cured dental composite has formed a veneer over the prosthetic tooth element to form a finished dental prosthesis fixed to the root.
Figure 15:
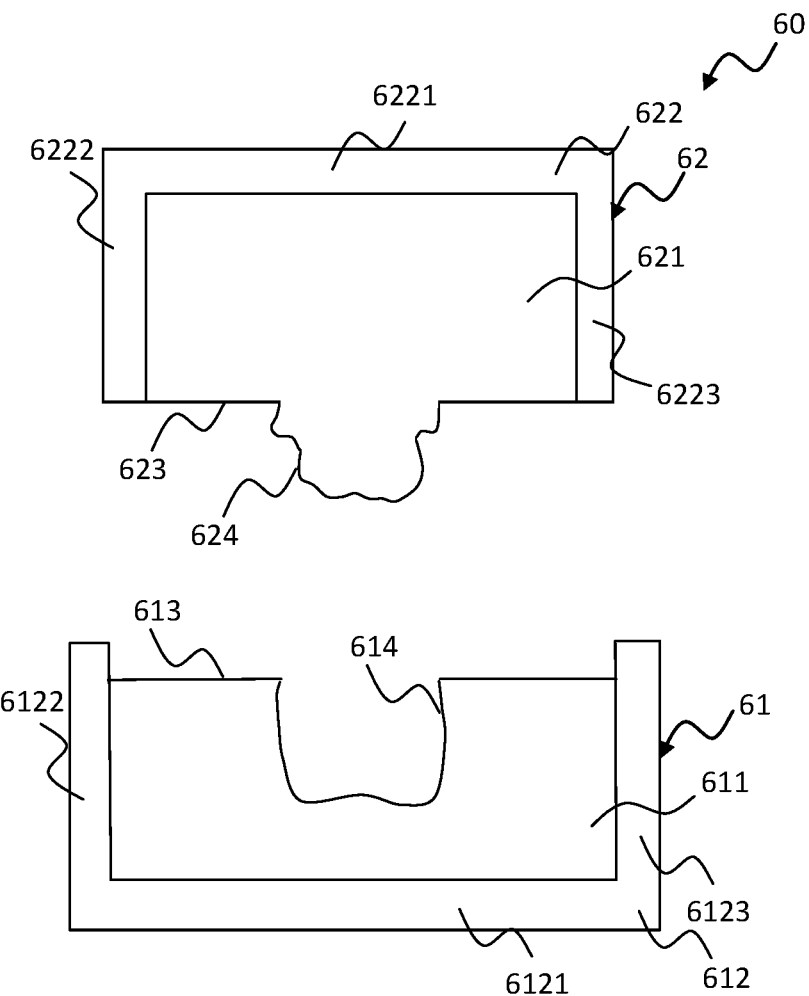
FIG. 15 shows a cross-sectional exploded side view of a mould used in a method of forming a prosthetic tooth element with a roughened surface according to an embodiment of the present disclosure.

As also represented in FIG. 13, the coating 52 is then subjected to light curing through the application of light 30 from a light source such as a tungsten halogen light, LED light or otherwise, which light 30 has a suitable intensity, duration and wavelength to effect the curing. The curing causes the coating 52 to harden, forming a dental composite veneer 54 on the surface of the prosthetic tooth element 50 and thus forming a substantially finished dental prosthesis 5 as represented in FIG. 14. The light source can be the same light source as used to cure the bonding material 55.

According to an embodiment of the present disclosure, as illustrated with reference to FIGS. 15 to 19, a method of forming a prosthetic tooth element with a roughened surface is disclosed herein. After forming, the prosthetic tooth element can be used in the preparation of a dental prosthesis using methods discussed above with reference to FIGS. 1 to 14, or used to prepare a dental prosthesis by alternative methods.

The method of forming the prosthetic tooth element uses a mould 60 including a first mould part 61 and a second mould part 62. Each of the first and second mould parts 61, 62 includes a body 611, 621 of flexible polymeric material and a casing 612, 622 located at outer surfaces of the body 611, 621.

As seen in cross-section, the flexible body 611 of the first mould part 61 has three substantially straight/flat side surfaces that are bonded to the casing 612. A fourth side surface of the flexible body 611 remains exposed from the casing 612 and provides a flexible first engagement surface 613 of the mould 60.

The first engagement surface 613 includes a recess 614 that provides a flexible negative mould portion. The negative mould portion has a shape that is substantially the reciprocal of a shape of a desired outer surface of the prosthetic tooth element, including e.g., an occlusial or incisal surface 23 of a prosthetic tooth element as discussed above with reference to FIG. 3.

The casing 612 of the first mould part 61 includes a rear plate 6121 and side walls 6122, 6123 that depend from edges of the rear plate 6121. The side walls 6122, 6123 are substantially parallel to each other and have distal ends that extend beyond that first engagement surface 613 of the mould 60.

Similarly, the flexible body 621 of the second mould part 62 has three substantially straight/flat side surfaces that are bonded to the casing 622. A fourth side surface of the flexible body 621 remains exposed from the casing 622 and provides a flexible second engagement surface 623 of the mould 60.

The second engagement surface 623 includes a projection 624 that provides a flexible positive mould portion. The positive mould portion has a shape that is substantially the reciprocal of the shape of a desired inner surface of the prosthetic tooth element, e.g., including a surface of a recess 21 of a prosthetic tooth element as discussed above with reference to FIG. 3. The casing 622 includes a rear plate 6221 and side walls 6222, 6223 that depend from edges of the rear plate 6221. The side walls 6222, 6223 are substantially parallel to each other and have distal ends that are flush with the second engagement surface 623 of the mould 60.

Figure 16:
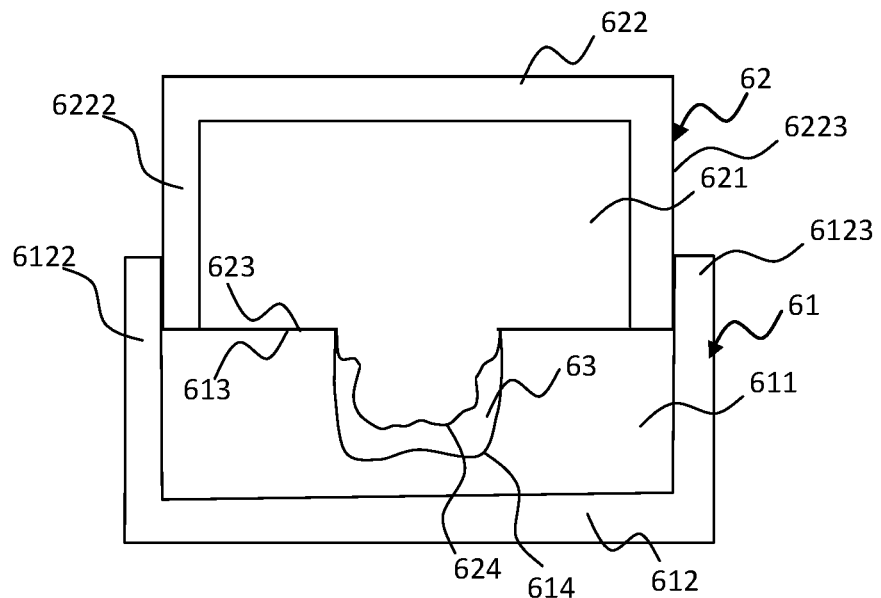
FIG. 16 shows a cross-sectional side view of the mould of FIG. 15 with mould parts engaged.

When the first and second engagement surfaces 613, 623 are brought into abutment, the projection 624 extends into the recess 614 and a prosthetic tooth element-shaped recess 63 is defined between the projection 624 and the recess 614, as shown in FIG. 16. Moreover, the sidewalls 6122, 6123, 6222, 6223 of the casings 612, 622 overlap each other in a relatively snug-fit manner to prevent lateral relative movement of the first and second engagement surfaces 613, 623.

The mould 60 can be manufactured specifically for a patient. For example, during manufacture of the patient-specific mould, in order to determine appropriate shapes for the prosthetic tooth element-shaped recess 63, a dental impression may be obtained from the patient. Alternatively, the mould can be non-patient specific. For example, the shape of the prosthetic tooth element-shaped recess may be based on generic models of teeth and mounts of different sizes, determined through computer analysis of average representations of patients' teeth, for example.

Figure 17:
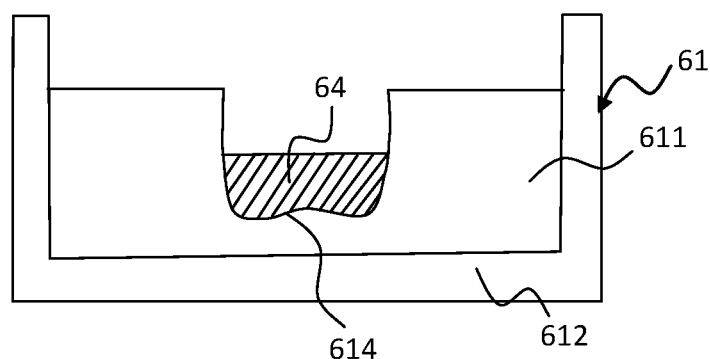
FIG. 17 shows a cross-sectional side view of a mould part of the mould of FIG. 15 having a dental mixture contained therein.

In practice, prior to bringing the first and second engagement surfaces 613, 623 into abutment, the recess 614 of the first mould part 61 is filled with a dental mixture 64, generally as illustrated in FIG. 17.

Figure 18:
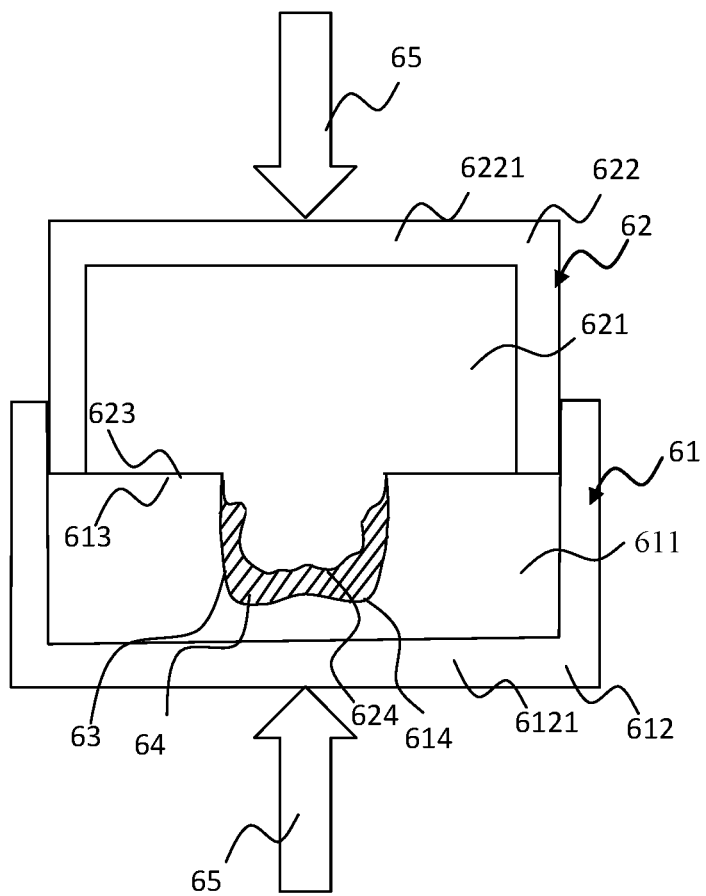
FIG. 18 shows a cross-sectional side view of the mould of FIG. 15 subject to pressure with dental mixture contained therein.
Figure 19:
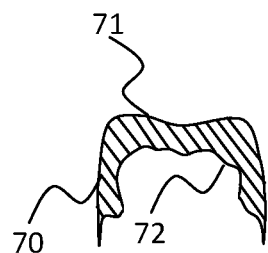
FIG. 19 shows a cross-sectional side view of a prosthetic tooth element formed using the mold of FIG. 15.

During and/or subsequent to bringing the first and second engagement surfaces 613, 623 into abutment with the dental mixture in the first mould part 61, high pressure is applied in opposing directions to the first and second mould parts 61, 62, generally as illustrated by arrows 65 in FIG. 18. The pressure is transferred to the dental mixture 64, forcing the dental mixture 64 to take the shape of the prosthetic tooth element-shaped recess 63 and therefore form a prosthetic tooth element 70 as illustrated in FIG. 19.

The pressure is applied specially to outer surfaces of the rear plates 6121, 6221 of the casings 612, 622. The casings 612, 622, including the plates 6121, 6221, are formed of metal such as steel and are therefore relatively hard in comparison to the flexible polymeric bodies 611, 621. The casings 612, 622 therefore serve as supports for the bodies 611, 621, generally retaining the bodies 611, 621 therein when the pressure is applied. Moreover, the casings 612, 622, and specifically the rear plates 6121, 6221, provides solid, uniform surfaces to which pressure can be applied. Pressure applied to the rear plates 6121, 6221 is transferred through the respective bodies 611, 621 to the dental mixture 64, causing the formation of the prosthetic tooth element 70.

Once the prosthetic tooth element 70 is formed, since the surfaces of the prosthetic tooth element-shaped recess 63 are formed of flexible polymeric material, it is relatively easy to remove the prosthetic tooth element 70 from the mould 60. The ease of removal is further enhanced through the surfaces of the recess 63 being relatively smooth When the pressure is applied to the mould, since the bodies 611, 621 of the mould parts 61, 62 are flexible, vibration and other types of relative motion occur at the interface between the dental mixture 64 and the surfaces of the prosthetic tooth element-shaped recess 63. The motion causes irregularities and therefore roughness to be introduced to the surface of the prosthetic tooth element 70. The roughened surface has surface irregularities with depth of greater than 5 µm in this embodiment. Other degrees of surface roughening may be achieved, however. In addition to the surface roughness, an increased fibrousness in the body of the prosthetic tooth element is also caused by the relative motion at the interface, reducing the ease at which cracks may propagate through the prosthetic tooth element during subsequent use.

In this embodiment, pressure is applied to the plates 6121, 6221 at about 2 tonnes per square centimetre. Moreover, this pressure is applied non-uniformly over time. In particular, the pressure is applied for a period of 1 minute, released, and then re-applied for a further period of 1 minute. Other pressure levels and periods of application may be employed, however. Pressure is applied using pressure application apparatus (not shown) such as a hydraulic or pneumatic ram.

In this embodiment, the entire outer surface of the prosthetic tooth element is roughened by the manufacturing technique. A veneer may be applied to a first portion 71 of the roughened surface, and bonding material, to bond the prosthetic tooth element to a mount such as the root of a tooth, may be applied to a second portion 72 of the roughened surface. In this regard, the prosthetic tooth element may be modified and implanted in a mouth generally as described with respect to preceding embodiments, including with reference to FIGS. 1 to 13, for example.

The flexible polymeric material is sufficiently rigid to enable the bodies 612, 622 of the mould parts to form the prosthetic tooth element 70 of a desired shape under pressure, yet sufficiently flexible to vibrate/move under pressure in order to cause the roughened surface to be formed. In this embodiment, the bodies 612, 622 of the mould parts 61, 62 are formed of silicone rubber, although other flexible polymeric materials may be used.

The dental mixture 64 in this embodiment comprises a ceramic, in particular zirconia powder mixed with a binding agent.

Figure 20:
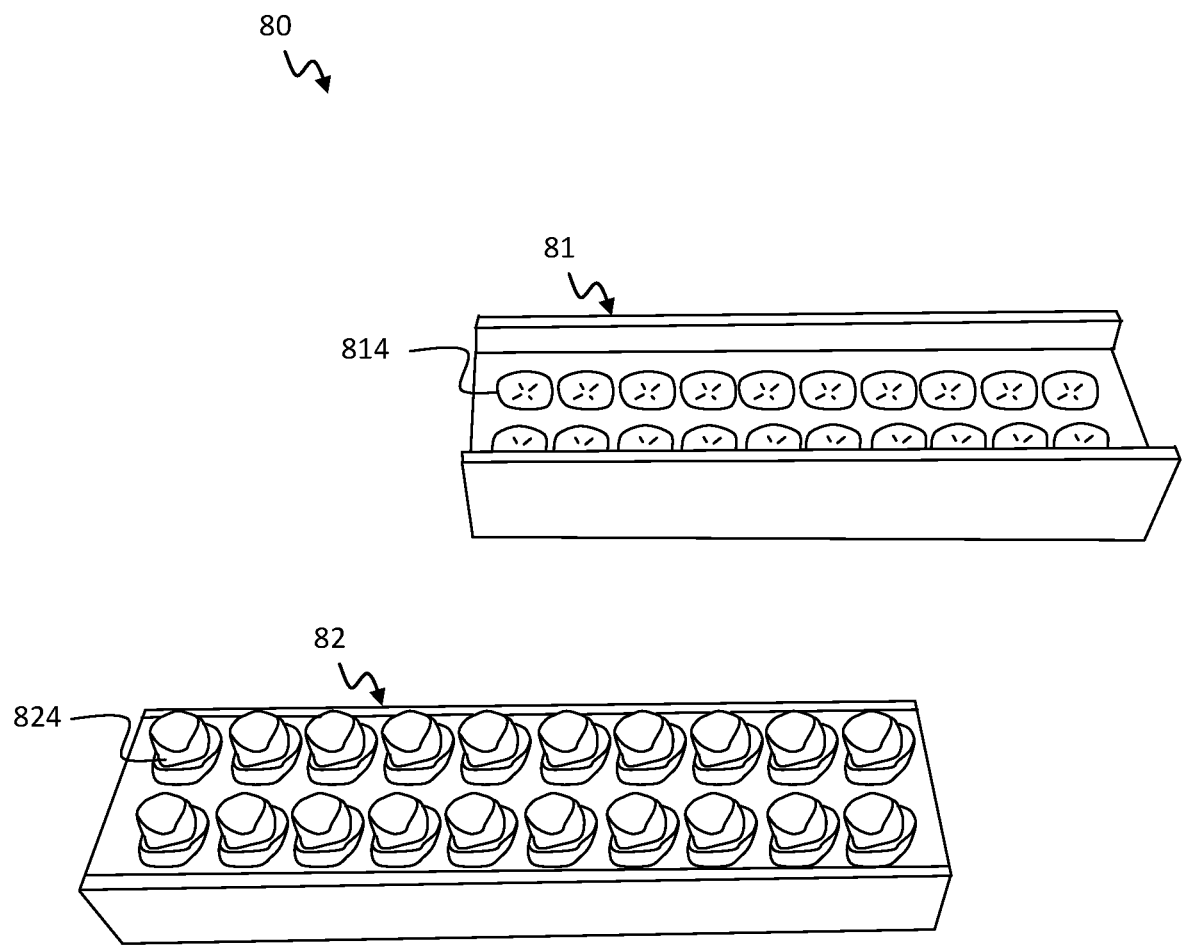
FIG. 20 shows an oblique view of a mould according to another embodiment of the present disclosure.

In one embodiment, as illustrated in FIG. 20, the mould is adapted to form multiple prosthetic tooth elements at the same time. In particular, a mould 80 is provided that includes first and second mould parts 81, 82, configured and used substantially in accordance with the mould parts 61, 62 of the mould 60 described above with reference to FIGS. 15 to 19, but each with a plurality of recesses 814 and projections 824, respectively, that combine to form a plurality of prosthetic tooth element-shaped recesses when the first and second mould parts 81, 82 are brought together. The mould 80 can be used to manufacture multiple non-patient specific prosthetic tooth elements at the same time. Having a number of pre-fabricated non-patient specific prosthetic tooth elements of several sizes at a clinic may save a patient multiple visits to the clinic and increase efficiency of a dental restoration procedure, for example.

It will be appreciated by persons skilled in the art that numerous variations and/or modifications may be made to the above-described embodiments, without departing from the broad general scope of the present disclosure. For example, in one embodiment, dental composite used for the coating/veneer and the bonding material may be light-cured at the same time, rather than at different times. As another example, the dental composite used for the bonding material may be different from the dental composite used for the coating/veneer. As another example, the bodies of the mould parts may be formed only partially of flexible polymeric material, while still achieving the surface roughening due to movement of a portion of the bodies of the mould parts. The present embodiments are, therefore, to be considered in all respects as illustrative and not restrictive.

The invention claimed is:

1. A method of forming a prosthetic tooth element comprising:
    filling a prosthetic tooth element-shaped recess of a compression mould with a dental mixture comprising ceramic, the compression mould comprising a first mould part and a second mould part that are brought together to form the prosthetic tooth element-shaped recess, at least one of the first and second mould parts comprising a flexible polymeric body and a rigid plate located at an outer surface of the flexible polymeric body; and
    applying pressure to the plate to compress the dental mixture and form a prosthetic tooth element comprising ceramic, wherein the pressure is applied at greater than 0.5 tonnes per square centimetre or greater than 1.0 tonnes per square centimetre or about 2.0 tonnes per square centimetre to cause vibration of flexible polymeric material of the mould such that the prosthetic tooth element is formed with a roughened surface.

2. The method of claim 1, wherein the dental mixture comprises ceramic powder and a bonding agent.

3. The method of claim 1, wherein the roughened surface extends around all of the prosthetic tooth element.

4. The method of claim 1, comprising forming a veneer on a first portion of the roughened surface.

5. The method of claim 4, wherein forming the veneer comprises applying a dental composite to the first portion and curing the dental composite.

6. The method of claim 1, comprising bonding a second portion of the roughened surface to a mount.

7. The method of claim 6, wherein bonding the second portion to the mount comprises applying a dental composite between the first portion and the mount and curing the dental composite.

8. The method of claim 1, wherein the flexible polymeric material is silicone rubber.

9. The method of claim 1, wherein surfaces of the prosthetic tooth element-shaped recess are defined by the flexible polymeric material of the mould.

10. The method of claim 1, wherein the first and second mould parts each include a flexible polymeric body and a rigid plate located at an outer surface of the flexible polymeric body.

11. The method of claim 10, wherein the pressure is applied to the plate of each of the mould parts.

12. The method of claim 1, wherein the pressure is applied non-uniformly by applying the pressure over a first period, releasing the pressure and then reapplying the pressure.

13. The method of claim 1, wherein the ceramic comprises at least one of zirconia, zirconia-oxide and aluminium oxide.

14. The method of claim 5, wherein the dental composite is light-curable and the method comprises curing the dental composite by exposing the dental composite to light.

15. A compression mould for forming a prosthetic tooth element comprising ceramic, the mould comprising:
 a first mould part and a second mould part adapted to be brought together to form a prosthetic tooth element-shaped recess, at least one of the first and second mould parts comprising a flexible polymeric body and a rigid plate located at an outer surface of the flexible polymeric body;
 wherein the compression mould is configured to be filled with dental mixture comprising ceramic and for a pressure to be applied to the plate to compress the dental mixture and form a prosthetic tooth element comprising ceramic, the plate being configured to withstand application of the pressure at greater than 0.5 tonnes per square centimetre or greater than 1.0 tonnes per square centimetre or about 2.0 tonnes per square centimetre to cause vibration of the flexible polymeric body such that the prosthetic tooth element is formed with a roughened surface.

16. The compression mould of claim 15, wherein surfaces of the prosthetic tooth element-shaped recess are defined by the flexible polymeric material of the flexible polymeric body.

17. The compression mould of claim 16, wherein the flexible polymeric material is silicone rubber.

* * * * *